United States Patent
Scholl et al.

(10) Patent No.: US 7,001,979 B2
(45) Date of Patent: Feb. 21, 2006

(54) POLYAMIDE AND COMPOSITION AND ARTICLE INCLUDING SAME

(75) Inventors: Steven L. Scholl, Cottage Grove, MN (US); Sharf U. Ahmed, Woodbury, MN (US); Andualem W. Emiru, Woodbury, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 226 days.

(21) Appl. No.: 10/172,389

(22) Filed: Jun. 14, 2002

(65) Prior Publication Data

US 2003/0232962 A1 Dec. 18, 2003

(51) Int. Cl.
*C07G 69/08* (2006.01)
*C07C 55/00* (2006.01)

(52) U.S. Cl. .................. 528/330; 524/607; 528/310; 562/590

(58) Field of Classification Search ........ 528/310, 528/323, 324, 326; 562/606; 554/1
See application file for complete search history.

(56) References Cited

U.S. PATENT DOCUMENTS

| | | | |
|---|---|---|---|
| 3,784,495 A | * | 1/1974 | Sprauer et al. ......... 528/330 |
| 4,018,731 A | | 4/1977 | Sims |
| 4,045,389 A | | 8/1977 | Drawert et al. |
| 4,150,002 A | | 4/1979 | Drawert et al. |
| 4,196,108 A | | 4/1980 | Hinze et al. |
| 4,217,256 A | | 8/1980 | Peerman et al. |
| 4,218,351 A | | 8/1980 | Rasmussen |
| 4,232,145 A | | 11/1980 | Schmid et al. |
| 4,820,796 A | | 4/1989 | Suzuki et al. |
| 4,892,927 A | * | 1/1990 | Meyer et al. ............ 528/324 |
| 4,985,534 A | | 1/1991 | Heinz et al. |
| 5,191,060 A | | 3/1993 | Akkapeddi et al. |
| 5,278,249 A | | 1/1994 | Marrion |
| 5,288,799 A | * | 2/1994 | Schmid et al. ............. 525/66 |
| 5,321,120 A | | 6/1994 | Sommerfeld |
| 5,416,171 A | | 5/1995 | Chung et al. |
| 5,422,420 A | | 6/1995 | Shridharani |
| 5,489,667 A | | 2/1996 | Knipf et al. |
| 5,569,707 A | | 10/1996 | Blum et al. |
| 5,618,909 A | | 4/1997 | Lofquist et al. |
| 5,708,125 A | | 1/1998 | Liedloff et al. |
| 5,744,570 A | | 4/1998 | Gebben |
| 5,750,232 A | | 5/1998 | Steenblock et al. |
| 5,989,697 A | | 11/1999 | Gebben |

FOREIGN PATENT DOCUMENTS

JP      58103558 A2    6/1983

OTHER PUBLICATIONS

ASTM D–4499–95 (Reapproved 2000), "Standard Test Method for Heat Stability of Hot–Melt Adhesives", (1995).
"Prisorine and Pripol", UNIQEMA brochure, 2001.
ASTM D–4499–95 (Reapproved 2000), "Standard Test Method for Heat Stability of Hot–Melt Adhesives", (1995).

* cited by examiner

*Primary Examiner*—Johann Richter
*Assistant Examiner*—Karl Puttlitz

(57) ABSTRACT

A polyamide that includes the reaction product of dimer acid (e.g. a dimer acid including at least 98% by weight dimer), caprolactam, hexamethylene diamine, sebacic acid, and optionally, chain terminating agent.

39 Claims, No Drawings

I # POLYAMIDE AND COMPOSITION AND ARTICLE INCLUDING SAME

BACKGROUND

The invention relates to a polyamide and compositions including the polyamide.

Many articles that incorporate an adhesive composition or a polymeric coating must withstand repeated or prolonged contact with a variety of liquids. Textile labels, filters used in the automotive industries, and filters used in purifying water are examples of articles that are used in applications that involve water, polar solvents, gasoline or oils.

Textile labels often include information printed on a piece of material that has been treated with a hot melt composition. Some textile labels also include an adhesive composition coated on one or more surfaces of the material. Textile labels are designed to permanently retain the printed information and are used in many forms including, e.g., emblems, patches and labels for laundry instruction and identification. These labels are applied to garments and other materials by sewing or heat-sealing and must be capable of successfully withstanding repeated home laundering, commercial laundering or dry cleaning conditions and processes. Although a number of organic solvent-based adhesive compositions have been developed to aid in maintaining print on textile labels, the use of organic solvents in industry is disfavored due to the harmful environmental effects and health and safety concerns associated with such solvents. Organic solvent-based compositions are also undesirable because they tend to discolor when exposed to ultraviolet radiation.

Many filter applications require the adhesive composition present on the filter to be insoluble in the liquid being filtered. If the adhesive composition is soluble in or breaks down in the presence of the liquid being filtered, the liquid can become contaminated, which can impair or destroy the integrity and function of the filter.

SUMMARY

In one aspect, the invention features a polyamide that includes the reaction product of dimer acid, caprolactam, hexamethylene diamine, sebacic acid, and optionally, chain terminating agent, the polyamide exhibiting a viscosity no greater than 20,000 centipoise at 205° C. In one embodiment, the polyamide exhibits a viscosity no greater than 10,000 centipoise at 205° C. In other embodiments, the polyamide exhibits a viscosity from about 2,000 centipoise to about 10,000 centipoise at 205° C. In another embodiment, the dimer acid comprises at least 98% by weight dimer. In some embodiments, the polyamide is free of visible color.

In one embodiment, the dimer acid comprises dimerized fatty acids having from 18 to 44 carbon atoms. In some embodiments, the dimer acid includes 36 carbon atoms. In other embodiments, the dimer acid is essentially free of fatty acid monomer. In other embodiments, the dimer acid includes no greater than 0.1% by weight fatty acid monomer. In some embodiments, the dimer acid includes no greater than 1% by weight fatty acid trimer.

In other embodiments, the caprolactam includes epsilon caprolactam.

In other embodiments, the polyamide includes the reaction product of from about 5 parts by weight to about 40 parts by weight the dimer acid, from about 10 parts by weight to about 60 parts by weight the caprolactam, and from about 5 parts by weight to about 35 parts by weight the hexamethylene diamine. In some embodiments, the polyamide includes the reaction product of dimer acid, caprolactam, hexamethylene diamine, sebacic acid and chain terminating agent.

In some embodiments, the chain terminating agent is selected from the group consisting of stearic acid, hexadecanoic acid and combinations thereof. In other embodiments, the chain terminating agent comprises stearic acid. In some embodiments, the amount of stearic acid is from about 0.1 part by weight to about 3.5 parts by weight.

In one embodiment, the amount of the sebacic acid is from about 5 parts by weight to about 35 parts by weight.

In other embodiments, the amount of the dimer acid is from about 15 parts by weight to about 25 parts by weight, the amount of the caprolactam is from about 15 parts by weight to about 45 parts by weight, the amount of the sebacic acid is from about 15 parts by weight to about 30 parts by weight, and the amount of the hexamethylene diamine is from about 10 parts by weight to about 30 parts by weight. In another embodiment, the amount of the dimer acid is from about 15 parts by weight to about 25 parts by weight, the amount of the caprolactam is from about 25 parts by weight to about 35 parts by weight, the amount of the sebacic acid is from about 20 parts by weight to about 25 parts by weight, and the amount of the hexamethylene diamine is from about 15 parts by weight to about 25 parts by weight.

In another embodiment, a polyamide described herein has an acid number of from about 2 to about 40. In other embodiments, a polyamide described herein has an acid number of from about 8 to about 15. In some embodiments, a polyamide described herein has an amine number of from about 2 to about 40. In another embodiment, a polyamide described herein has an amine number of from about 8 to about 15. In some embodiments, a polyamide described herein having a ring and ball softening point of from about 265° F. to about 310° F.

In another aspect, the invention features a polyamide that includes the reaction product of dimer acid comprising at least 98% by weight dimer, caprolactam, hexamethylene diamine, sebacic acid, and, optionally, chain terminating agent. In some embodiments, the amount of the dimer acid is from about 15 parts by weight to about 25 parts by weight, the amount of the caprolactam is from about 15 parts by weight to about 45 parts by weight, the amount of the sebacic acid is from about 15 parts by weight to about 30 parts by weight, and the amount of the hexamethylene diamine is from about 10 parts by weight to about 30 parts by weight. In other embodiments, the amount of the dimer acid is from about 15 parts by weight to about 25 parts by weight, the amount of the caprolactam is from about 25 parts by weight to about 35 parts by weight, the amount of the sebacic acid is from about 20 parts by weight to about 25 parts by weight, and the amount of the hexamethylene diamine is from about 15 parts by weight to about 25 parts by weight.

In some embodiments, the polyamide exhibits a change in weight of no greater than 25% after exposure to oil for a period of seven days at 250° F. In other embodiments, the polyamide exhibits a change in weight of no greater than 25% after exposure to a 50/50 glycol/water mixture for a period of seven days at 180° F. In other embodiments, the polyamide exhibits a change in weight of no greater than 25% after exposure to a diesel fuel for a period of seven days at 140° F. In other embodiments, the polyamide exhibits a change in weight of no greater than 25% after exposure to unleaded gasoline containing 10% ethanol for a period of seven days at 77° F. In another embodiment, the polyamide exhibits a Shore A hardness of from about 90 to about 100. In another embodiment, the polyamide exhibits a change in Shore A hardness of no greater than 15% after exposure to oil for a period of seven days at 250° F. In other embodiments, the polyamide exhibits a change in Shore A hardness of no greater than 15% after exposure to diesel fuel for a period of seven days at 140° F. In other embodiments, the polyamide exhibits a change in Shore A hardness of no greater than 15% after exposure to 50/50 glycol/water mixture for a period of seven days at 180° F. In other embodiments, the polyamide exhibits a change in Shore A hardness of no greater than 15% after exposure to unleaded gasoline containing 10% ethanol for a period of seven days at 77° F.

In another aspect, the invention features a hot melt composition that includes a polyamide polymer comprising the reaction product of dimer acid comprising at least 98% by weight dimer, caprolactam, hexamethylene diamine, dicarboxylic acid, and optionally, chain terminating agent, and ultraviolet light stabilizing agent. In some embodiments, the ultraviolet light stabilizing agent includes 2,5-thiophenyediylbis (5-tert-butyl-1,3-benzoxazole). In some embodiments, the dicarboxylic acid is selected from the group consisting of sebacic acid, dodecanoic acid, adipic acid, azelaic acid, and combinations thereof.

In some aspects, the invention features an article that includes a hot melt adhesive composition that includes a polyamide polymer including the reaction product of dimer acid comprising at least 98% by weight dimer, caprolactam, hexamethylene diamine, sebacic acid, and optionally, chain terminating agent, and a substrate having a first surface and a second surface, the first surface being bonded to the second surface through the hot melt adhesive composition. In some embodiments, the substrate includes a filter. In some embodiments, the substrate includes a pleated filter. In some embodiments, the first surface includes a first terminal pleat of the filter and the second surface includes a second terminal pleat of the filter. In some embodiments, the filter includes a fuel filter.

In some embodiments, the hot melt adhesive composition is capable of maintaining the surfaces of the substrate bonded together after immersion of the article in motor oil for at least seven days at 250° F. In some embodiments, the surfaces of the substrate remain bonded together through the adhesive composition after immersion of the article in diesel fuel for at least seven days at 140° F.

In another aspect, the invention features an article that includes a hot melt adhesive composition that includes a polyamide polymer including the reaction product of dimer acid, caprolactam, hexamethylene diamine, sebacic acid, and optionally, chain terminating agent, the hot melt adhesive composition having a viscosity of no greater than 20,000 centipoise at 205° C., and a substrate having a first surface and a second surface, the first surface being bonded to the second surface through the hot melt adhesive composition.

In one embodiment, the article includes a substrate, and a composition that includes a polyamide polymer disposed on the substrate, the polyamide polymer including the reaction product of dimer acid comprising at least 98% by weight dimer, caprolactam, hexamethylene diamine, sebacic acid, and optionally, chain terminating agent. In some embodiments, the substrate is selected from the group consisting of a nonwoven web and a woven web.

In other embodiments, the article is a label. In some embodiments, the label includes ink. In another embodiment, the composition is in the form of a coating on the substrate of the label and the ink is disposed on the coating. In other embodiments, the substrate of the label is impregnated with the composition. In another embodiment, the ink is in the form of information. In one embodiment, the substrate of the label is selected from the group consisting of a nonwoven web and a woven web, and the polyamide polymer includes the reaction product of from about 15 parts by weight to about 25 parts by weight the dimer acid, from about 25 parts by weight to about 35 parts by weight epsilon caprolactam, from about 20 parts by weight to about 25 parts by weight the sebacic acid, and from about 15 parts by weight to about 25 parts by weight the hexamethylene diamine.

In another embodiment the article is a filter. In another embodiment, the invention features a filter that includes a porous substrate, and an adhesive composition disposed on said porous substrate, the adhesive composition including the reaction product of dimer acid, caprolactam, hexamethylene diamine, dicarboxylic acid, and optionally, chain terminating agent, the adhesive composition exhibiting less than 18 mg extractives residue/$in^2$ porous substrate when tested according to the Extraction Test Method using a water extraction media.

In one aspect, the invention features a fiber that includes a polyamide described herein.

In another aspect, the invention features a nonwoven web that includes a polyamide described herein. In one embodiment, the nonwoven web includes fibers that include a polyamide described herein.

In other aspects, the invention features a film that includes a polyamide described herein.

The invention features a polyamide that is well suited to textile applications. The polyamide can be formulated to be clear and colorless and to exhibit good ultraviolet light stability. The polyamide can also be formulated to exhibit good stability when exposed to heat and water, e.g., can be wash resistant. The polyamide can also be formulated to be printable, i.e., capable of receiving and retaining ink.

Use of the polyamide in place of organic solvent-based compositions can also provide processing free of the harmful environmental effects associated with the organic solvents of organic solvent-based compositions.

Other features of the invention will be apparent from the following description of the preferred embodiments thereof, and from the claims.

DETAILED DESCRIPTION

The polyamide exhibits hot melt adhesive properties, i.e., is nontacky at room temperature, is tacky when heated, and exhibits adhesive bond strength. The polyamide also is nonblocking and can be wound upon itself to form a roll without sticking to itself. The polyamide can be formulated to be stable in heat and water and preferably passes Food and Drug Administration (FDA) Test Method FDA-175-300 for repeated use (21 CFR 175.300 FDA Water and Heptane Extraction Testing, Feb. 20, 2002).

The polyamide can be formulated with components such as ultraviolet light (UV) stabilizers to exhibit UV stability.

The polyamide also exhibits good resistance to chemicals such as oil and gas. One method of determining chemical resistance includes measuring the change in weight and the change in Shore A hardness of the compound before and after exposure to the chemical. Preferably the polyamide exhibits a change in weight of no greater than 25%, preferably no greater than 20%, more preferably no greater than 10%, most preferably 0% after immersion in oil for a period of seven days at 250° F., after immersion in 50/50 glycol/water mixture for a period of seven days at 180° F., diesel fuel for a period of seven days at 140° F., or unleaded gasoline containing 10% ethanol for a period of seven days at 77° F.

The polyamide also preferably exhibits a Shore A hardness of from about 96 to about 100 and a change in Shore A hardness of no greater than 15%, preferably no greater than 10%, more preferably 0% after immersion in oil for a period of seven days at 250° F., after immersion in 50/50 glycol/water mixture for a period of seven days at 180° F., after immersion in diesel fuel for a period of seven days at 140° F., or after immersion in unleaded gasoline containing 10% ethanol for a period of seven days at 77° F.

The polyamide is prepared by reacting dimer acid, caprolactam, hexamethylene diamine, dicarboxylic acid, and, optionally, a chain terminating agent. The resulting polyamide preferably exhibits a viscosity of from about 2000 centipoise (cps) to about 40,000 cps, more preferably from about 4000 cps to about 20,000 cps, most preferably from about 4,000 to about 10,000 cps at 400° F. and has an acid number from about 2 to about 40, more preferably from about 10 to about 20, most preferably from about 8 to about 15. Alternately, the polyamide can be amine terminated and have an amine number from about 2 to about 40, more preferably from about 10 to about 20, most preferably from about 8 to about 15. The polyamide exhibits a ring and ball softening point of from about 250° F. to about 350° F., more preferably from about 265° F. to about 310° F.

Suitable dimer acids include, e.g., fatty acid hydrogenated dimers having alkyl groups that include from 18 to 44 carbon atoms. Preferred dimer acids are pure, i.e., the components present in the dimer acid other than dimer, e.g., monomer and trimer, are present in an amount of less than 2%, more preferably less than 1%, most preferably less than 0.5% by weight based on the weight of the dimer acid. Preferably the dimer acid is at least 98% by weight dimer, more preferably at least 98.5% by weight. One useful commercially available dimer acid is available under the trade designation Pripol 1009 from Unichema (New Castle, Del.) and includes a mixture of hydrogenated dimerized fatty acids having 36 carbon atoms and includes greater than 98.5% dimer, no greater than 0.1% monomer and no greater than 2.0% trimer.

The amount of dimer acid present in the reaction mixture is preferably from about 5 parts by weight to about 40 parts by weight, more preferably from about 10 parts by weight to about 30 parts by weight, most preferably from about 15 parts by weight to about 25 parts by weight.

Epsilon caprolactam is the preferred caprolactam. Caprolactam is preferably present in the reaction mixture in an amount of from about 10 parts by weight to about 60 parts by weight, more preferably from about 15 parts by weight to about 45 parts by weight, most preferably from about 25 parts by weight to about 35 parts by weight.

Suitable dicarboxylic acids have an alkyl group that includes 6, 8, 10 or 12 carbon atoms. Examples of suitable dicarboxylic acids include sebacic acid, dodecanedioic acid, azelaic acid, adipic acid and combinations thereof. Preferably the dicarboxylic acid is sebacic acid. The amount of dicarboxylic acid present in the reaction mixture is from about 5 parts by weight to about 35 parts by weight, preferably from about 15 parts by weight to about 30 parts by weight, more preferably from about 20 parts by weight to about 25 parts by weight.

The amount of hexamethylene diamine present in the reaction mixture is from 5 parts by weight to about 35 parts by weight, preferably from about 10 parts by weight to about 30 parts by weight, more preferably from about 15 parts by weight to about 25 parts by weight.

The reaction mixture may optionally include a chain terminator. Useful chain terminators include, e.g., stearic acid, hexadecanoic acid, monoamines including, e.g., benzyl amine, hexylamine, octadecylamine, and monoamines commercially available under the ARMEEN 18D trade designation from Akzo Nobel Chemicals Inc., (McCook, Ill.), and combinations thereof. The amount of chain terminator, when present in the reaction mixture, preferably is present in an amount of no greater than 5 parts by weight, and can be present in an amount from about 0.1 parts by weight to about 3.5 parts by weight, and from about 1 part by weight to about 3.5 parts by weight.

The polyamide is preferably prepared by condensation reaction.

The composition can include a catalyst to speed the rate of reaction of the formation of the polyamide. An example of a suitable catalyst is hypophosphoric acid, sodium benzene phosphonate, sodium benzene phosphinate and combinations thereof.

The polyamide can be used neat as a 100% solids hot melt composition or formulated with other components to form various hot melt compositions including, e.g., hot melt pressure sensitive adhesives. Other components that can be combined with the polyamide include, e.g., thermoplastic polymers, tackifiers, plasticizers, antioxidants (e.g., Irganox 1098, 1010 and 1076), coloring agents including, e.g., pigment (e.g., titanium dioxide, calcium carbonate clay, talc, terra alba, bentonite, barium sulfate, zinc oxide, silica, alumina, cellulose powder, starch particles, phthalocyanine pigment synthetic resin powders, and combinations thereof), UV stabilizers, corrosion inhibitors, and combinations thereof.

Suitable tackifying agents include, e.g., rosin derivatives including wood rosin, tall oil, tall oil derivatives, pentaerythritol esters of tall oil, gum rosin, rosin ester resins, natural and synthetic terpenes, and aliphatic tackifying resins (e.g., hydrogenated $C_9$ resins, branched and unbranched $C_5$ resins and mixtures thereof) and mixed aromatic-aliphatic tackifying resins (e.g., styrenated terpene resins, styrenated $C_5$ resins and mixtures thereof) and mixtures thereof.

Useful plasticizers preferably have aromatic character and a softening point of at least 60° C. Other useful plasticizers include aromatic carboxylic acid esters of polyfunctional alcohol having from 1 to 10 hydroxyl groups. Suitable polyfunctional alcohols include, e.g., compounds having at least two hydroxyl groups and at least two carbon atoms including ,e.g., ethylene glycol, propylene glycol, 1,2-butylene glycol, 1,4-butylene glycol, glycerine, glucose, fructose, sucrose, manifold, trimethylol ethane, 1,4-cyclohexane dimethanol, pentaerythritol, 2,2-dimethyl-1,3-propane diols, 2-hydroxy methyl-2-methyl-1,3propane diol and neopentyl glycol. Aromatic acids that can be used with the polyfunctional alcohols to form ester plasticizers include, e.g., aromatic carboxylic acids (preferably having one aromatic group and at least one carboxyl function) examples of which include benzoic acid, naphthanoic acid, 4-mehtyl benzoic acid and 1,4-cyclohexane dimethanol dibenzoate. Examples of suitable plasticizers include benzoates, phthalates, polyols, liquid polyesters (preferably liquid polyesters having a molecular weight less than about 1500) and combinations thereof.

Useful UV stabilizers impart ultraviolet light resistance to the polyamide and preferably inhibit or prevent visible yellowing of the polyamide and compositions formulated with the polyamide. Examples of suitable UV stabilizers include 2,5-thiohenyediylbis(5-tert-butyl-1,3-benzoxazole); bis-(1-Octyloxy-2,2,6,6-tetramethyl-4-piperidinyl)sebacate; 2-(2H-Benzotirazol-2yl)-4,6-bis(1-methyl-1-phenylether) phenol; 2-(5-chloro-2H-benzotuiazol-2-yl)-6-(1,1-dymethylethil)-4-methylphenol; 2-(3',5'-de-tert-butyl-2'-hydroxyphenyl)-5-chlorobenzotriazole; 2-(2H-benzotriazol-2-yl)-4,6-bis(1,1-dimethylpropyl)phenol; dimethyl succuinate polymer with 4-hydroxy-2,2,6,6-tetramethyl-1-piperdineethanol; bis(2,2,6,6-tetramethyl-4-piperidinyl) sebacate; 1,3,5-triazine-2,4,6-triamine, N,N'''-[1,2-ethanediylbis[[[4,6-bis[butyl(1,2,2,6,6-pentametyl-4-piperidinyl)amino]-1,3,5-triazine-2-yl]imino]-3,1-propanediyl]]-bis[N',N''-dibutyl-N',N''-bis(1,2,2,6,6-pentamethyl-4-piperidinyl); poly[[6-[1.1.3.3-tetramethyl butyl)amino]-s-triazine-2,4-diyl][[2,2,6,6-tetramethyl-4-piperidinyl)imino]hexamethylene[(2,2,6,6-tetramethyl-4-piperidyl)imino]]; 1,6-hexanediamine, N,N'-bis(2,2,6,6,-tetramethyl-4-piperdinyl)-polymer with -2,4,6-trichloro-1,3, 5-triazine, reaction products with N-butyl-1-butanamine and N-butyl-2,2,6,6-tetramethyl-4-piperdinamine.

Suitable UV stabilizers are commercially available under the TINUVIN series of trade designations including, e.g., TINUVIN 123, 234, 326, 328, 622 and 770, and CHIMASSORB 119, 944 and 202 all available from Ciba Specialty Chemicals (Tarrytown, N.Y.), blends of light stabilizers available under the TINUVIN series of trade designations including, e.g., TINUVIN 111, 123 S, 492, 494, 783, 791, and C 353, under the IRGASTAB series of trade designations including, e.g., IRGASTAB FS 210, FS 410, FS 811 and FS 812, FIBERSTAB L 112 and UVITEX OB 2,5-thiophenyediylbis(5-tert-butyl-1,3-benzoxazole) all from Ciba Specialty Chemicals.

The polyamide and compositions formulated therewith are useful in a variety of applications including, e.g., coatings (e.g., continuous and discontinuous coatings), adhesives, sealants (e.g., heat sealants), films and laminates (e.g., for textile lamination) and can be formed into various articles including, e.g., fibers, filaments, woven and nonwoven webs, films, composites and combinations thereof. Films including the polyamide are useful in processes such as laminating and printing.

The polyamide can be applied in its various forms to a variety of substrates including, e.g., woven and nowoven webs, fibers, filaments, filters, textiles, honeycomb structures, components of footwear and films (e.g., polymer and cellulose). The polyamide is well suited for use as a coating on woven and nonwoven labels used in textile and clothing industries, and as an adhesive for bonding substrates together including, e.g., the pleats (e.g., terminal pleats) of a filter including, e.g., air filters, water filters, oil filters, fuel filters and filters used in engines including, e.g., vehicle engines (e.g., automobiles, trucks, tractors, farm equipment and agricultural equipment) and industrial filters including industrial filters exposed to various chemicals.

The invention will now be described further by way of the following examples. All parts, ratios, percents and amounts stated in the Examples are by weight unless otherwise specified.

EXAMPLES

Test Procedures

Test procedures used in the examples include the following.

Method of Determining Viscosity

Viscosity of a sample is determined using a Model DVII+ Brookfield Viscometer (Brookfield Engineering Laboratories, Inc., Stoughton, Mass.) according to the following procedure. A number 27 spindle attached to the viscometer and placed in a 10.5 g sample that is kept heated at 400° F. (205° C.). The spindle is rotated at 20 rotations per minute (rpm) for 20 minutes. After 20 minutes a reading is taken and recorded in centipoise.

Method of Determining Ring and Ball Softening Point

Ring and ball softening point is determined according to ASTM Test Method ASTM E 28-99 Standard Test Methods for Softening Point of Resins Derived from Naveal Stores by Ring and Ball Apparatus (Dec. 10, 1999) in which kaydol oil (i.e., white mineral oil) is used instead of glycerin.

Method of Determining Acid Number

Acid number is determined by placing a 2 g sample of polyamide into a 250 mL glass Erlenmeyer flask, and then adding 100 ml of 50:50 isopropyl alcohol/toluene and a stirring bar to the flask. The sample is refluxed with a water-cooled condenser on a stirring/hot plate until the sample is completely dissolved. If the sample has not dissolved after 30 minutes of refluxing use it as is. The solution is then allowed to cool to room temperature. 1 ml of phenolphthalein indicator is added to the solution. The flask is then stirred while titrating to a pink end point using standardized 0.1 N alcoholic potassium hydroxide. The endpoint should persist for five minutes. The volume of potassium hydroxide required to reach the endpoint is recorded in milliliters.

A blank of 100 ml 50:50 isopropyl alcohol/toluene is placed in a glass Erlenmeyer flask, 1 ml of phenolphthale n indicator is added to the solution, and the mixture is then titrated using standardized 0.1 N alcoholic potassium to a pink endpoint. The volume of potassium hydroxide required to reach the endpoint is recorded in milliliters.

The acid number is then calculated according to the following equation:

$$\text{Acid Number} = \frac{(A \times N \times 56.1)}{w}$$

where A=milliliters of potassium hydroxide titrated (sample—blank), N=normality of the alcoholic potassium hydroxide solution and w=grams of sample.

Method of Determining Amine Number

Amine number is determined by placing a 2 g sample of polyamide into a 250 mL glass Erlenmeyer flask. 100 ml of 50:50 isopropyl alcohol/distilled water solution is added to the flask. The sample is refluxed with a water-cooled condenser on a stirring hot plate until the sample is completely dissolved. The solution is then allowed to cool slightly but remains warm during the titration. 5 ml of bromocresol green indicator is added to the solution. The flask is then shaken or stirred while titrating to a yellow end point using standardized 0.100 N hydrochloric acid.

The amine number is then calculated according to the following equation:

$$\text{Amine Number} = \frac{(A \times N \times 56.1)}{w}$$

where A=milliliters of hydrochloric acid titrated, N=normality of the hydrochloric acid solution and w=grams of sample.

Method of Determining Shore A Hardness

Shore A hardness is determined by measuring the durometer of a 1.40 in×1.25 in ×0.15 in sample using a Model No. 306L Type A Shore A durometer conforming to ASTM 2240-75 (Pacific Transducer Corp., Los Angeles, Calif.).

UV Stability

The stability of the polyamide in the presence of ultraviolet light is determined according to Canadian General Standard Board Test Method 12.8. A film of sample is placed in a Canadian Fog Chamber and exposed to ultraviolet light generated by a Sylvania R-S1 100 watt spit lamp #H44GS-100 for a period of seven days at 140° F.

The sample is removed from the chamber and observed for color. If there is no visible yellowing or browning, the sample is deemed to be UV stable.

Hydrolytic Stability

A film of sample is immersed in a 140° F. water bath and left in the water bath for seven days. After seven days the sample is removed and observed to determine if any degradation, e.g., solvation, has occurred. If the sample is intact, the sample is deemed to be hydrolytically stable. If the sample has degraded, e.g., at least partially dissolved, the sample is not hydrolytically stable.

Heat Stability

Heat stability is determined according to ASTM-D-4499-95 (Re-Approved 2000) entitled, "Heat Stability of Hot-Melt Adhesives." The initial viscosity of a portion of the sample is measured and recorded along with the color of the sample. The sample is then placed in a thermosel and the thermosel is placed in an oven that has been preheated to 400° F. The viscosity of the sample is measured at four hour intervals over a period of 24 hours and recorded. The sample is also observed for color and signs of degradation including the presence of charring or gelling. The observations are recorded.

A sample that is free of or has negligible degradation, yellowing and browning after 24 hours, and that does not exhibit a change in viscosity of more than 75% from its initial viscosity value is reported as heat stable.

Chemical Resistance

The Shore A hardness of a 1.40 in×1.25 in×0.15 in sample is measured according to the above-described method and recorded.

The weight of the sample is then measured. The sample is placed in a glass jar. From 30 g to 35 g of the test fluid is added to the jar. The immersed sample is then exposed to heat for a period of 7 days. The samples are then cooled to room temperature, held at room temperature for 24 hours, removed from the test fluid and wiped drying using a soft absorbent paper towel. The dried samples are then weighed and the Shore A hardness is measured.

A sample is given a pass rating if there is no greater than a 25% change in weight and durometer as measured from the original values obtained on the sample to the values obtained on the sample after exposure to the chemical and conditions specified.

A sample is given a fail rating if there is greater than a 25% change in weight or durometer as measured from the original values obtained on the sample to the values obtained on the sample after exposure to the chemical and conditions specified.

Extraction Test Method

A sample composition is prepared in the form of a 4 in×6 in film. Seven film samples are used in each test for a total area of 168 in². The samples are tested according to 21 CFR 175.300 FDA (Food and Drug Administration) Water and Heptane Extraction Testing (Feb. 20, 2002) with the following exceptions: the test specimen is a film of composition as opposed to an article on which the composition has been coated, a two liter glass beaker is used as the extraction vessel, and the extractives residue is calculated in parts per million (ppm) based on 2000 g (i.e., the total weight of the extraction media in the extraction vessel).

The seven film samples are immersed in two liters of extraction media. When water is the extraction media, the water is maintained at 212° F. and the samples remain in the water for 30 minutes. When heptane is the extraction media, the heptane is maintained at 120° F. and the samples remain in the heptane for 30 minutes.

The samples are then removed from the vessel, the extraction media is concentrated to approximately 100 mL, transferred to a weighing dish, dried down, and the residue is weighed.

The amount of extracted residue from the seven film samples is recorded in mg. The residue extracted per square inch of sample is then calculated and reported in mg/in².

A specimen receives a pass rating for a coating intended for repeated use if the extractives residue is less than 18 mg/in².

If the extractives residue exceeds 18 mg/in², a chloroform extraction is performed in which 50 ml of chloroform is added to the residue (at room temperature, i.e., about 72° F.) and then the chloroform/residue mixture is filtered. This chloroform extraction step is repeated one more time. The chloroform extract is collected in a pre-weighed dish, evaporated, and weighed. The amount of residue resulting from the chloroform extraction is recorded in mg and the amount of extractives residue is calculated and reported in mg/in².

The sample passes the criteria under 21 CFR 175.300 FDA for repeated use if the residue from the chloroform extraction is less than 18 mg/in².

EXAMPLE 1

The polyamide polymer was prepared by combining 19.99 g PRIPOL 1009 dimer acid (Uniqema Corp., New Castle, Del.), 22.26 g sebacic acid, 3.2 g stearic acid, 30.38 g epsilon caprolactam, 23.3 g 70% hexamethylene diamine and 0.04 g 50% hypophosphoric acid in a four neck reaction kettle. The kettle was kept at a temperature of from 120° F. to 140° F. with its valve closed to react the acid and the amine. After five minutes the vessel was placed under nitrogen gas and the mixture was heated at 265° F. to 285° F. until the first batch of water started to come out of the vessel. The temperature was then slowly increased to a temperature of 500° F. to 520° F. After most of the water had been removed from the composition, the reaction was held at 500° F. to 520° F. for 1–2 hours under vacuum. The vacuum was released by introducing nitrogen gas into the reaction kettle 0.73 g IRGANOX 1010 antioxidant (Ciba Specialty Chemicals Corp, Tarrytown, N.Y.), and 0.10 g UVITEX OB ultraviolet light stabilizer (Ciba Specialty Chemicals) were then added to the kettle and mixed at 475° F. to 500° F. for 30 minutes. Vacuum was pulled on the kettle for an additional 30 minutes at 450° F. to 475° F. The product was then maintained under nitrogen as it was drained into an appropriate container.

The composition had a ring and ball softening point of 290° F., a viscosity of 5,300 cps (5300 mPas-sec) at 400° F., an acid number of 10.7 and an amine number of 0.1.

The resulting composition was then tested for UV stability, heat stability and hydroscopic stability. The composition exhibited a viscosity of change of less than 10% after 24 hours at 400° F. No visible discoloration or degradation was observed. The composition did not dissolve when tested according to the hydrolytic stability test. The composition exhibited UV stability, heat stability and hydrolytic stability.

The polyamide of Example 1 was tested according to the chemical resistance test method. The samples were weighed and the Shore A hardness was measured before and after exposing the samples to the test fluids and conditions set forth in Table 1. The results are set forth in Table 1.

TABLE 1

| Sample | Temperature | Test Fluid | Weight (g) | Weight (g) | Shore A | Shore A | % Weight change | % Change in Shore A Hardness |
|---|---|---|---|---|---|---|---|---|
| 1 | 250° F. | Diesel Oil[1] | 3.6 | 3.6 | 100 | 100 | 0 Pass | 0 Pass |
| 2 | 250° F. | Oil[2] | 4.2 | 4.2 | 97 | 100 | 0 Pass | 3 Pass |
| 3 | 180° F. | 50/50 Ethylene Glycol/water[3] | 4.3 | 4.6 | 98 | 98 | 6.9 Pass | 0 Pass |
| 3 | 180° F. | 50/50 propylene glycol/water[4] | 3.8 | 4.6 | 97 | 95 | 21.0 Pass | 2 Pass |
| 5 | 140° F. | Diesel Fuel[5] | 3.5 | 3.5 | 99 | 99 | 0 Pass | 0 Pass |
| 6 | 77° F. | Unleaded gasoline and at least 10% ethanol | 4.1 | 4.8 | 98 | 85 | 17 Pass | 13.2 Pass |
| 7 | 140° F. | Unleaded gasoline and at least 10% ethanol | 3.8 | 5.1 | 98 | 85 | 34.2 Fail | 13.2 Pass |

[1]Premium Blue diesel oil
[2]Hy-Tran plus MS1207 oil
[3]50/50 mixture by weight of polyethylene glycol and water.
[4]A 50/50 mixture by weight of polyproplyene glycol and water.
[5]Winter formulated diesel fuel.

Portions of the composition of Example 1 was formed into a film and tested according to the Extraction Test Method. The results are reported in Table 2.

TABLE 2

| Extraction Media | Extractives (mg) | Extractives (mg/in$^2$) | Pass or Fail 21 CFR 175.300 for Repeated Use |
|---|---|---|---|
| Water | 514 | 3.1 | Pass |
| Chloroform | 257 | 1.5 | Pass |
| Heptane | 21.6 | 0.026 | Pass |

Other embodiments are within the claims.

What is claimed is:

1. A polyamide comprising the reaction product of
dimer acid;
caprolactam;
hexamethylene diamine;
sebacic acid; and
optionally, chain terminating agent,
said polyamide exhibiting a viscosity no greater than 20,000 centipoise at 205° C.

2. The polyamide of claim 1, wherein said polyamide exhibits a viscosity no greater than 10,000 centipoise at 205° C.

3. The polyamide of claim 1, wherein said polyamide exhibits a viscosity from about 2,000 centipoise to about 10,000 centipoise at 205° C.

4. The polyamide of claim 1, wherein said dimer acid comprises at least 98% by weight dimer.

5. The polyamide of claim 1, wherein said polyamide is free of visible color.

6. The polyamide of claim 1, wherein said dimer acid comprises dimerized fatty acids having from 18 to 44 carbon atoms.

7. The polyamide of claim 1, wherein said dimer acid comprises 36 carbon atoms.

8. The polyamide of claim 1, wherein said dimer acid is essentially free of fatty acid monomer.

9. The polyamide of claim 1, wherein said dimer acid comprises no greater than 0.1% by weight fatty acid monomer.

10. The polyamide of claim 1, wherein said dimer acid comprises no greater than 1% by weight fatty acid trimer.

11. The polyamide of claim 1, wherein said caprolactam comprises epsilon caprolactam.

12. The polyamide of claim 1, the reaction product of from about 5 parts by weight to about 40 parts by weight said dimner acid, from about 10 parts by weight to about 60 parts by weight said caprolactam, and from about 5 parts by weight to about 35 parts by weight said hexamnethylene diamine.

13. The polyamide of claim 1, wherein the polyamide comprises the reaction product of dimer acid, caprolactam, hexamethylene diamine, sebacic acid and chain terminating agent.

14. The polyamide of claim 13, wherein said chain terminating agent is selected from the group consisting of stearic acid, hexadecanoic acid and combinations thereof.

15. The polyamide of claim 13, wherein said chain terminating agent comprises stearic acid.

16. The polyamide of claim 15, wherein the amount of stearic acid is from about 0.1 part by weight to about 3.5 parts by weight.

17. The polyamide of claim 16, wherein the amount of said sebacic acid is from about 5 parts by weight to about 35 parts by weight.

18. The polyamide of claim 16, wherein the amount of said dimer acid is from about 15 parts by weight to about 25 parts by weight, the amount of said caprolactam is from about 15 parts by weight to about 45 parts by weight, the amount of said sebacic acid is from about 15 parts by weight to about 30 parts by weight, and the amount of said hexamethylene diamine is from about 10 parts by weight to about 30 parts by weight.

19. The polyamide of claim 16, wherein the amount of said dimer acid is from about 15 parts by weight to about 25 parts by weight, the amount of said caprolactam is from about 25 parts by weight to about 35 parts by weight, the amount of said sebacic acid is from about 20 parts by weight to about 25 parts by weight, and the amount of said hexamethylene diamine is from about 15 parts by weight to about 25 parts by weight.

20. A polyamide according to claim 1 having an acid number of from about 2 to about 40.

21. A polyamide according to claim 1 having an acid number of from about 5 to about 15.

22. A polyamide according to claim 1 having an amine number of from about 2 to about 40.

23. A polyamide according to claim 1 having an amine number of from about 8 to about 15.

24. A polyamide according to claim 1 having a ring and ball softening point of from about 265° F. to about 310° F.

25. A polyamide comprising the reaction product of
   dimer acid comprising at least 98% by weight dimer;
   caprolactam;
   hexamethylene diamine;
   sebacic acid; and
   optionally, chain terminating agent.

26. The polyamide of claim 25, wherein the amount of said dimer acid is from about 15 parts by weight to about 25 parts by weight, the amount of said caprolactam is from about 15 parts by weight to about 45 parts by weight, the amount of said sebacic acid is from about 15 parts by weight to about 30 parts by weight, and the amount of said hexamethylene diamine is from about 10 parts by weight to about 30 parts by weight.

27. The polyamide of claim 25, wherein the amount of said dimer acid is from about 15 parts by weight to about 25 parts by weight, the amount of said caprolactam is from about 25 parts by weight to about 35 parts by weight, the amount of said sebacic acid is from about 20 parts by weight to about 25 parts by weight, and the amount of said hexamnethylene diamine is from about 15 parts by weight to about 25 parts by weight.

28. The polyamide of claim 25, wherein said dimer acid comprises dimerized fatty acids having from 18 to 44 carbon atoms.

29. The polyamide of claim 25, wherein said dimer acid comprises 36 carbon atoms.

30. The polyamide of claim 25, wherein said dimer acid is essentially free of fatty acid monomer.

31. The polyamide of claim 1, wherein said polyamide exhibits a change in weight of no greater than 25% after immersion in oil for a period of seven days at 250° F.

32. The polyamide of claim 1, wherein said polyamide exhibits a change in weight of no greater than 25% after immersion in 50/50 glycol/water mixture for a period of seven days at 180° F.

33. The polyamide of claim 1, wherein said polyamide exhibits a change in weight of no greater than 25% after immersion in unleaded gasoline containing 10% ethanol for a period of seven days at 77° F.

34. The polyamide of claim 1, wherein said polyamide exhibits a change in weight of no greater than 25% after immersion in diesel fuel for a period of seven days at 140° F.

35. The polyamide of claim 1, wherein said polyamide exhibits a Shore A hardness of from about 90 to about 100.

36. The polyamide of claim 1, wherein said polyamide exhibits a change in Shore A hardness of no greater than 15% after immersion in oil for a period of seven days at 250° F.

37. The polyamide of claim 1, wherein said polyamide exhibits a change in Shore A hardness of no greater than 15% after immersion in diesel fuel for a period of seven days at 140° F.

38. The polyamide of claim 1, wherein said polyamide exhibits a change in Shore A hardness of no greater than 15% after immersion in unleaded gasoline containing 10% ethanol for a period of seven days at 77° F.

39. The polyamide of claim 1, wherein said polyamide exhibits a change in Shore A hardness of no greater than 15% after immersion in a 50/50 glycol/water mixture for a period of seven days at 180° F.

* * * * *

UNITED STATES PATENT AND TRADEMARK OFFICE
CERTIFICATE OF CORRECTION

PATENT NO. : 7,001,979 B2
DATED : February 21, 2006
INVENTOR(S) : Steven L. Scholl et al.

It is certified that error appears in the above-identified patent and that said Letters Patent is hereby corrected as shown below:

<u>Column 12,</u>
Line 53, after "claim 1," insert -- comprising --.
Line 55, delete "dimner" and insert -- dimer --.
Line 57, delete "hexamnethylene" and insert -- hexamethylene --.

<u>Column 13,</u>
Line 26, after "from about" delete "5" and insert -- 8 --.

<u>Column 14,</u>
Line 5, delete "hexamnethylene" and insert -- hexamethylene --.

Signed and Sealed this

Ninth Day of May, 2006

JON W. DUDAS
*Director of the United States Patent and Trademark Office*